United States Patent
Baker

(10) Patent No.: US 11,813,566 B2
(45) Date of Patent: Nov. 14, 2023

(54) MEMBRANE CO2 SEPARATION PROCESS

(71) Applicant: Membrane Technology and Research, Inc., Newark, CA (US)

(72) Inventor: Richard W. Baker, Palo Alto, CA (US)

(73) Assignee: Membrane Technology and Research, Inc., Newark, CA (US)

( * ) Notice: Subject to any disclaimer, the term of this patent is extended or adjusted under 35 U.S.C. 154(b) by 242 days.

(21) Appl. No.: 17/315,902

(22) Filed: May 10, 2021

(65) Prior Publication Data
US 2021/0354078 A1 Nov. 18, 2021

Related U.S. Application Data

(60) Provisional application No. 63/025,699, filed on May 15, 2020.

(51) Int. Cl.
| | |
|---|---|
| B01D 53/22 | (2006.01) |
| B01D 53/00 | (2006.01) |
| B01D 53/10 | (2006.01) |
| B01D 51/10 | (2006.01) |

(52) U.S. Cl.
CPC ............ *B01D 53/22* (2013.01); *B01D 51/10* (2013.01); *B01D 53/002* (2013.01); *B01D 2257/504* (2013.01); *B01D 2257/80* (2013.01); *B01D 2258/0283* (2013.01); *B01D 2311/04* (2013.01); *B01D 2311/06* (2013.01); *B01D 2311/106* (2013.01); *B01D 2311/14* (2013.01); *B01D 2311/25* (2013.01)

(58) Field of Classification Search
None
See application file for complete search history.

(56) References Cited

U.S. PATENT DOCUMENTS

| | | | |
|---|---|---|---|
| 5,199,962 A | 4/1993 | Wijmans | |
| 2011/0167821 A1 | 7/2011 | Baker et al. | |
| 2013/0058853 A1* | 3/2013 | Baker | B01D 53/62 |
| | | | 423/220 |
| 2019/0282952 A1 | 9/2019 | Li et al. | |

FOREIGN PATENT DOCUMENTS

EP 2196252 A1 6/2010

OTHER PUBLICATIONS

International Search Report and Written Opinion, International Application No. PCT/US2021/032020, dated Aug. 20, 2021, 11 pages.

* cited by examiner

*Primary Examiner* — Youngsul Jeong
(74) *Attorney, Agent, or Firm* — Stinson LLP

(57) ABSTRACT

Described herein are membrane processes for separating $CO_2$ from flue gas. An exemplary process involves passing a fluid stream including the flue gas across a membrane permeable to $CO_2$ and $H_2O$, removing treated gas from a feed side of the membrane that has less $CO_2$ than the flue gas, and removing permeate from a permeate side of the membrane comprising $CO_2$ and $H_2O$. Suitably, the permeate is removed at a sub-atmospheric vacuum pressure. The permeate is then cooled to remove at least some of the $H_2O$ from the permeate and form a smaller volume of $H_2O$-depleted, $CO_2$ enriched permeate.

52 Claims, 5 Drawing Sheets

MEMBRANE CO2 SEPARATION PROCESS

FIELD OF THE INVENTION

This invention relates to the separation of carbon dioxide ($CO_2$) from emission streams produced by combustion of carbon-containing fuels. A new membrane process design is described in which co-permeation of water vapor also present in the flue gas is used to enhance the $CO_2$ separation.

BACKGROUND OF THE INVENTION

Carbon dioxide capture from industrial gas emission streams is a topic of considerable current interest. These gas streams are produced by coal and natural gas electric power plants, but also by steel mills, cement and petrochemical plants, and oil refineries. As a class, these gas streams are often called flue gas. The $CO_2$ concentration in flue gas ranges from 4 to about 25% $CO_2$. A number of government agencies around the world are sponsoring research aimed at separating and concentrating this $CO_2$ to produce greater than 95% $CO_2$ that can be compressed and sequestered deep underground.

Membranes are being considered for these separation processes. Multistep membrane processes are required to perform the separation, and combinations of membrane processes with a final treatment step, for example cryogenic condensation, is often suggested. The key step in the process is the first membrane separation step, in which 50-90% of the $CO_2$ content of the emission stream is separated into a concentrate stream where the $CO_2$ is concentrated 3 to 5 fold over the concentration in the initial flue gas. The first step is generally the largest and most costly operation in the total process. We will describe this invention using examples of this first step, however, the process can also be applied to the second or other separation steps.

A gas separation membrane process is shown in a simple form in FIG. 1(a). As the feed gas flows across the membrane on the feed side, a portion of the gas permeates through the membrane. The flow of components on the feed side of membrane to the permeate side of the membrane is proportional to the difference in partial pressure driving force of each component across the membrane. The partial pressure on the feed side of the membrane is $n_{i_o} p_o$ (molar concentration $n_{i_o}$, pressure $p_o$) and on the permeate side of the membrane it is $n_{i_\ell} p_\ell$ (molar concentration $n_{i_\ell}$, pressure $p_\ell$). And thus, the partial pressure driving force is given by $\Delta p_{i_o} p_o \times n_{i_\ell} p_\ell$ The permeation rate of component ($J_i$) is then linked to the partial pressure driving force by the equation $$J_i = \frac{P_i}{\ell} \Delta p_i$$

Where $P_i$ is a constant of proportionality called the membrane permeability for component i, and $\ell$ is the membrane thickness. The ability of a membrane to differentiate between two components i and j is a function of several factors including the membrane selectivity ($\alpha_{i/j}$) that is, the ratio of the permeability of components i and j;

$$\alpha_{i/j} = \frac{P_i}{P_j} \tag{2}$$

as well as the pressure ratio across the membrane written as:

$$\theta = \frac{p_o}{p_\ell}$$

and the molar concentration of the more permeable component on the feed side of the membrane, $n_{i_o}$.

By way of example to illustrate these effects, consider the separation illustrated in FIG. 1(b). In this example, only a very small amount of the permeable gas $CO_2$ is removed from the feed as it moves left to right across the membrane. This means the concentration of $CO_2$ on the permeate side of the membrane is everywhere about the same. As described earlier, membrane permeation only occurs if the partial pressure of the permeate side of the membrane is less than the feed, that is $$n_{i_\ell} p_\ell \leq n_{i_o} p_o \tag{3}$$

This inequality can be rearranged to:

$$\frac{n_{i_\ell}}{n_{i_o}} \leq \frac{p_o}{p_\ell} \tag{4}$$

which shows that the enrichment of the permeating component ($CO_2$) is always less than the pressure ratio (feed pressure/permeate pressure). It also follows that the concentration of the permeating component ($CO_2$) can never be more than the expression:

$$n_{i_\ell} \leq n_{i_o} \times \frac{p_o}{p_\ell} = n_{i_\ell}^{max} \tag{5}$$

For the example in FIG. 1(b), this means that $n_{i_\ell}$ cannot be greater than 50% $CO_2$ ($n_{i_o}$=10% $CO_2$ and $$\frac{p_o}{p_\ell} = \frac{1.0 \text{ bar}}{0.2 \text{ bar}}$$

no matter how selective the membrane. This result has several implications; first, at least half of the permeate must be the slow component ($N_2$), and it is permeation of the slow component that determines the membrane area required to treat a specific amount of feed. Also, as the selectivity of the membrane increases, the amount of membrane area required to permeate the same amount of $CO_2$ increases. In the limit of infinite selectivity, no slow component permeates, hence infinite membrane area is required.

A membrane process is considered to be well within the pressure ratio limited region if the maximum permeate concentration $n_{i_\ell}^{max}$ given by equation 5 is less than 100%. In this region, the effect of pressure ratio is generally noticeable. The differences are even more significant if, in addition, the membrane selectivity is larger than the pressure ratio, and will be even more significant if the membrane selectivity is more than two or three times larger than the pressure ratio. Some of the issues of pressure ratio and its effect on membrane separation are discussed in detail by Huang, et al., Journal of Membrane Science, 463, 33 (2014).

Returning to FIG. 1(b), consider a specific example when the membrane has a selectivity for $CO_2/N_2$ of 25. In this case, the membrane selectivity is five times the pressure ratio, and the membrane is pressure ratio limited. In this example the feed (1), residue (2) and permeate (3) have the compositions:

TABLE 1

| Mol % | Feed (1) | Residue (2) | Permeate (3) |
|---|---|---|---|
| $CO_2$ | 10 | 10 | 36.1 |
| $N_2$ | 90 | 90 | 63.9 |
| Pressure | 1.0 | 1.0 | 0.2 |

Consider a very similar separation using the same membrane but this time a feed that also contains 10% water. The membrane, as before, has a $CO_2/N_2$ selectivity of 25 and in addition an $H_2O/CO_2$ selectivity of 3. Water is then the most permeable component, followed by $CO_2$, followed by $N_2$. The separation then performed by the membrane has the compositions:

TABLE 2

| Mol % | Feed (1) | Residue (2) | Permeate (3) | Permeate (3) dry basis |
|---|---|---|---|---|
| $CO_2$ | 10 | 10 | 31.2 | 52.9 |
| $N_2$ | 80 | 80 | 27.7 | 47.1 |
| $H_2O$ | 10 | 10 | 41.1 | 0 |

The water in the feed permeates even more rapidly than the $CO_2$, so permeation of water to the permeate side of the membrane dilutes the $CO_2$ on the permeate side, thereby increasing the driving force for $CO_2$ transport through the membrane. The membrane area required to permeate the same amount of $CO_2$ falls to 60% of the dry feed value. The permeate (3) at 0.2 bar has a slightly lower concentration of $CO_2$ and a much lower concentration of $N_2$, but a higher concentration of water. When water is removed by a dehydration process, the $CO_2$ concentration in the remaining permeate is 52.9%, a much better separation than the Table 1 results. Adding water to the feed gas and then removing it from the permeate allows the $CO_2$ to escape the limitation expressed in Equation 5.

This patent describes how, having recognized this result, we have exploited it in a new type of membrane separation process for the separation of $CO_2$ from flue gas.

SUMMARY

Described herein are membrane processes for separating $CO_2$ from flue gas. An exemplary process involves, passing a fluid stream including the flue gas across a membrane permeable to $CO_2$ and $H_2O$, removing treated gas from a feed side of the membrane that has less $CO_2$ than the flue gas, and removing permeate from a permeate side of the membrane comprising $CO_2$ and $H_2O$. The permeate is then cooled to remove at least some of the $H_2O$ from the permeate and form a smaller volume of $H_2O$-depleted, $CO_2$ enriched permeate.

In one aspect, a membrane process to separate $CO_2$ from flue gas comprises passing a fluid stream including the flue gas across a membrane permeable to $CO_2$ and $H_2O$. Treated gas is removed from a feed side of the membrane. The treated gas has less $CO_2$ than the flue gas. Permeate is removed from a permeate side of the membrane at a sub atmospheric pressure between 0.1 to 0.4 bar. The permeate comprises $CO_2$ and $H_2O$. The permeate is cooled to remove at least some of the $H_2O$ from the permeate and form a smaller volume of $H_2O$-depleted, $CO_2$ enriched permeate. A vacuum pump is used to increase the gas pressure to at least about atmospheric pressure;

In certain embodiments, the fluid stream passed across the membrane contains at least 70% of its saturation concentration of water.

In one or more embodiments, the temperature difference between the fluid stream passed across the membrane and the cooled $H_2O$-depleted $CO_2$-enriched permeate is at least 40° C.

In an exemplary embodiment, $H_2O$ is added to the flue gas before passing the fluid stream across the membrane such that the fluid stream that is passed across the membrane includes the flue gas and the water. In some embodiments, said adding $H_2O$ to the flue gas comprises using a direct contact cooler to add $H_2O$ to the flue gas before passing the fluid stream including the flue gas through the membrane. In some instances, the direct contact cooler adjusts the temperature of the flue gas.

In certain embodiments, the process further comprises bringing the fluid stream including the flue gas to a pressure of 0.8 to 1.5 bar before passing the fluid stream across the membrane.

In one or more embodiments, the process further comprises bringing the fluid stream including the flue gas to a temperature of greater than 50° C. before passing the fluid stream across the membrane. In an exemplary embodiment, the process further comprises bringing the fluid stream including the flue gas to a temperature in a temperature in a range of from about 50° C. to about 80° C. before passing the fluid stream across the membrane.

In some embodiments, the process comprises bringing the fluid stream including the flue gas to have greater than 10 mol % water vapor.

In one or more embodiments, the process comprises bringing the fluid stream including the flue gas to have greater than 70% of its saturation water concentration.

In an exemplary embodiment of the process, the membrane has an $H_2O/CO_2$ selectivity of greater than 2, measured at the operating conditions of the process, such as a $CO_2/N_2$ selectivity of greater than 10, measured at the operating conditions of the process.

In one or more embodiments, the membrane process removes at least 50% of the $CO_2$ of the flue gas, such as from about 50% to about 80% of the $CO_2$ of the flue gas.

In certain embodiments, said cooling the permeate comprises cooling the permeate to a temperature in an inclusive range of from about 5° C. to about 30° C.

In an exemplary embodiment, the water-depleted permeate has a $CO_2$ concentration of greater than 35%.

In another aspect, a system for separating $CO_2$ from flue gas comprises a membrane configured to be fluidly connected to a source of the flue gas such that a fluid stream that includes the flue gas is passable through the membrane. The membrane is configured to separate $CO_2$ and $H_2O$ from the fluid stream passing through the membrane to form separate streams of treated fluid and permeate. A condenser is fluidly connected to the membrane to receive the permeate. The condenser is configured to condense $H_2O$ of the permeate and form separate streams of condensed $H_2O$ and $H_2O$-depleted permeate.

In an exemplary embodiment, the system comprises a pretreatment unit configured to add $H_2O$ to the flue gas before the flue gas is passed through the membrane. The pretreatment unit can comprise a direct contact cooler.

In certain embodiments, the system further comprises a vacuum pump configured to draw the $H_2O$-depleted permeate from the condenser.

In another aspect, a membrane process to separate $CO_2$ from flue gas exhaust streams comprises (i) bringing the flue gas to a pressure of 0.8 to 1.5 bar and a temperature of greater than 50° C., and containing greater than 10 mol % water vapor; (ii) passing the flue gas from (i) across a membrane permeable to water and $CO_2$, said membrane having an $H_2O/CO_2$ selectivity of greater than 2 and a $CO_2/N_2$ selectivity of greater than 10, measured at the operating conditions of the process; (iii) removing from the feed side of the membrane of (ii) a depleted treated flue gas stream from which at least 50% of the $CO_2$ content of the gas has been removed; (iv) removing from the permeate side of the membrane in (ii) at a pressure of 0.1 to 0.4 bar, a permeate gas enriched in $CO_2$ and $H_2O$; (v) cooling the permeate gas from (iv) to a temperature of 5-30° C. to condense a portion of the $H_2O$ content of the gas and so lowering the $H_2O$ concentration of the permeate gas to produce a water-depleted permeate gas; (vi) separating the condensed water from the water-depleted permeate gas stream; and (vii) using a vacuum pump to bring the water-depleted permeate gas from (v) to atmospheric pressure or above.

In certain exemplary embodiments, the membrane process removes 50-80% of the $CO_2$ content of the membrane feed stream.

In one or more embodiments, the feed gas to the membrane unit has a temperature between 50-80° C.

In some embodiments of the membrane process, the water vapor content of the membrane feed gas is 70-100% of the water saturation concentration of the gas.

In certain embodiments, wherein a direct contact cooler is used to adjust the temperature and water concentration of the membrane feed gas stream in step (i).

In an exemplary embodiment of the membrane process, the flue gas exhaust stream is generated by a coal power plant, a natural gas power plant, a natural gas boiler, a cement plant, a steel plant or an oil refinery.

In one or more embodiments, the water concentration of the feed gas in (i) and the permeate gas enriched in $CO_2$ and $H_2O$ in (iv) differ by at least a factor of 2.

In an embodiment, the difference in temperature between the flue gas passing across the membrane in (ii) and the cooled permeate gas in (iv) is more than 30° C.

Other aspects and features will be apparent hereinafter.

BRIEF DESCRIPTION OF THE FIGURES OF THE INVENTION

DETAILED DESCRIPTION OF THE INVENTION

In the text that follows the concentration of the components in the gas are molar concentrations unless otherwise stated. Also, all process pressures are in bar absolute.

Figure 1A:
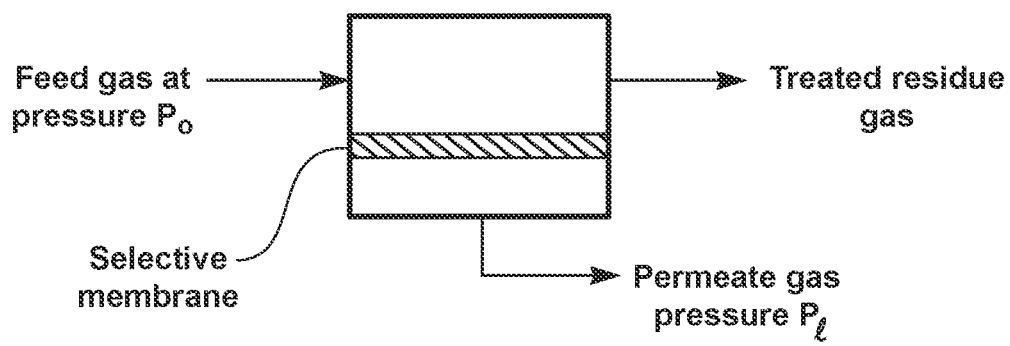
FIG. 1A is generic block diagram of a prior art membrane separation process.
Figure 1B:
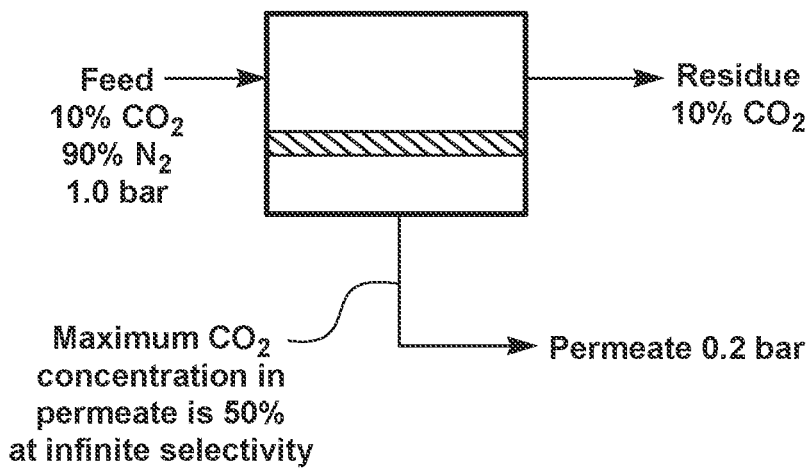
FIG. 1B is a block diagram similar to FIG. 1A, illustrating the prior art membrane separation process used for a feed gas at 1.0 bar and containing 10% $CO_2$ and 90% $N_2$.
Figure 2:
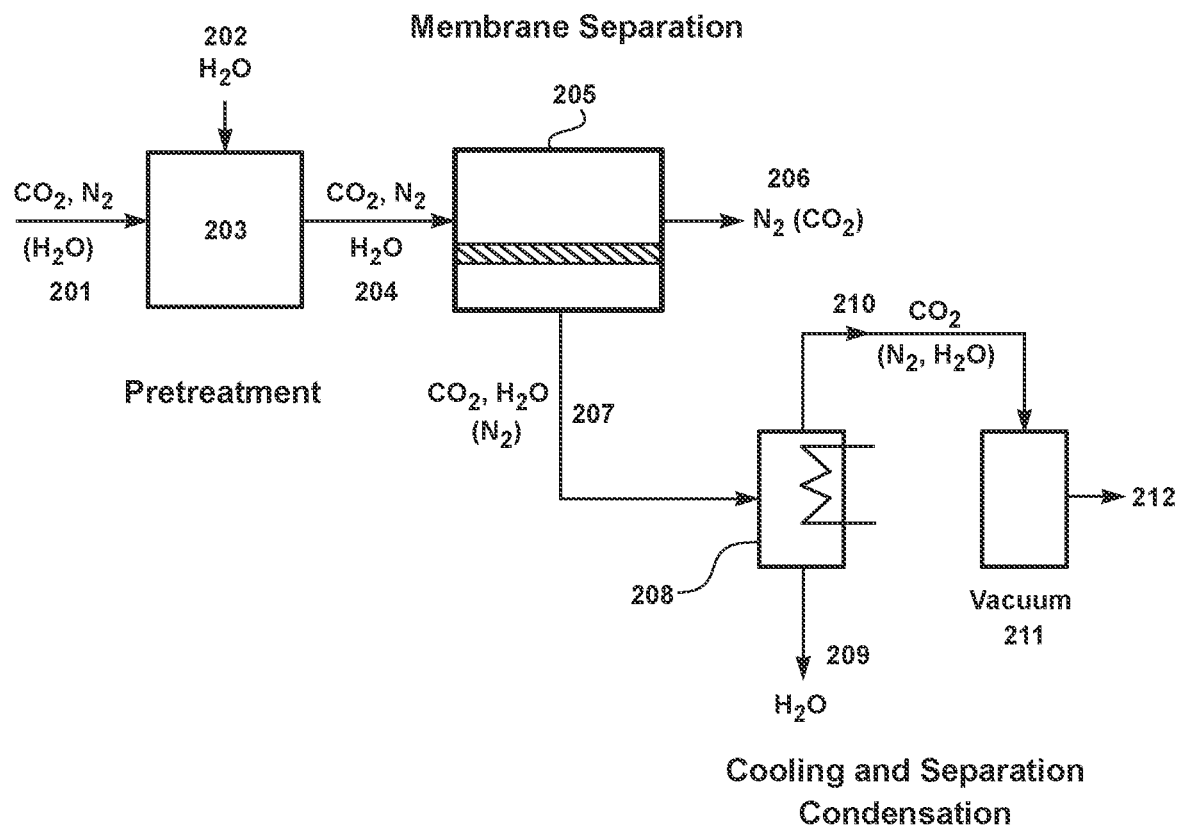
FIG. 2 is a simple block diagram of the unit operations utilized in the process of the invention.

The separation process of this invention as applied to the separation of $CO_2$ from flue gas is shown in a simple form in the block diagram of FIG. 2. This diagram shows the process of the invention as four steps.

The Pretreatment Step

Pretreatment: The incoming gas to the process (201) is a $CO_2$-containing flue gas containing 4-25% $CO_2$. The gas will normally be discharged to a chimney at close to atmospheric pressure however gas blowers may be used to raise the gas pressure to 1-1.1 bar. The gas will often already contain a relatively high concentration of water and it may be possible to treat the gas as is by the process of our invention. However, it may be required to bring the gas to a controlled temperature and water vapor content by sending the gas through a direct contact water spray tower in which water at an appropriate temperature is sprayed into the gas. Such a device has the additional benefit of removing particulates and other contaminants that may be present in the flue gas. Other devices, including heat exchangers, blowers, etc., can also be used to bring the gas to the required temperature, pressure and humidity content.

In this step (203), the $CO_2$, $N_2$-containing flue gas is brought to a composition, temperature and pressure suitable for the separation steps that follow. The flue gas mixture may already contain some water, but additional water (202) may be added to increase water vapor, $CO_2$ and $N_2$ composition required. The gas leaving this operation will normally be between 70-100% of its water saturation content.

In an exemplary embodiment, the treated flue gas (204) meets several requirements. First, the temperature of the gas is at least 30° C. and preferably 40° C. higher than the condensation step (208) that follows to allow a useful fraction of the water vapor in the membrane permeate (207) to be removed by cooling. In principle, the condensation step (208) can be carried out at any low temperature, but to be economically viable, separation of $CO_2$ from flue gas has to be a low-cost process. The cooling available is usually provided by an evaporative cooling plant and the cooling water produced will normally not be below 15° C. This means that if the pretreated gas to the membrane unit (204) is 30-40° C. higher than the cooled permeate gas (210), the minimum temperature of the pretreated gas (~20° C.) is about 50° C. to 60° C.

The upper temperature bound for the pretreated gas is set by the cost of providing energy to heat and humidify the gas, and the stability of the available membranes (205) at high temperatures. In general, the maximum treated flue gas temperature is 90° C. and more preferably 70-80° C.

The water content of the pretreated flue gas should be high to produce high concentrations in the water vapor enriched gas delivered to the permeate condensation step. The pretreated gas (204) should contain at least 10% water vapor, more preferably at least 15% water vapor, and most preferably at least 25 wt % water. Achieving these water vapor concentrations in gas streams between 50 and 90° C. means that the pressure of the pretreated flue gas cannot be more than 2 bar, and more normally will be below 1.5 bar. Also the gas should be at at least 70% of its saturation value and preferably close to 80 or 90% of its saturation value.

The Membrane Separation Step

The pretreated flue gas (204) is passed through to the membrane separation step (205) fitted with membranes permeable to water vapor and $CO_2$, and relatively impermeable to $N_2$, $O_2$, and Ar. Many polymeric membranes have these characteristics, but the most suitable membranes are made of polar rubbery materials such as the family of polyamide polyether block copolymers sold under the trade name Pebax®. The Polaris™ membrane made by Membrane Technology and Research, Inc. can also be used. Most of the membranes in current use for this type of application use these types of polymers fabricated into multilayer composite membranes. By making the selective layer of the membrane very thin, on the order of 0.1-0.5 μm, it is possible to produce membranes with $CO_2$ permeances of 1000-2000 gpu at 30° C. (1 gpu=1×10$^{-6}$ cm$^3$ (STP)/cm$^2$·sec·cmHg). The permeance of these membranes will increase 2-fold or more at temperatures of 50-80° C. At temperatures of 25-30° C., good quality $CO_2$ separating membranes when operated with flue gas will have $CO_2/N_2$ selectivity in the range of 25-50. When operated at higher temperatures, permeance will increase but $CO_2/N_2$ selectivity may fall to the 20-30 range. Because water is a small and condensable molecule, water permeances through almost all membranes are high and significantly higher than $CO_2$. Typical water/$CO_2$ selectivities will be in the range of 2-10 under the high-water content, high-feed gas temperatures required for the process of this invention.

Obtaining a useful separation requires a high-permeance, high-selectivity membrane, but it also requires that the pressure ratio across the membrane be at least above 5 for the reasons described earlier. Because the maximum pressure is 1.5 to 2.0 bar, it follows that generating pressure difference across the membrane of our process requires a low-pressure on the permeate side of the membrane below 0.3 to 0.4 bar. The lowest practical pressures for large industrial plant are in the range of 0.1 to 0.2 bar. So the preferred operating range on the permeate side of the membrane is 0.1 to 0.4 bar

The Condensation and Separation Step

The easiest way to generate low-pressure on the permeate side of our process is to use a vacuum pump. However, such pumps are expensive and consume a large amount of energy. This problem is overcome in our invention by using a cooling and condensation step (208) before the gas is sent to the vacuum pump (211). By cooling and condensing much of the water content of the gas (207), the volume of gas (210) sent to the vacuum pump is significantly reduced.

When the membrane feed gas meets the composition and temperature requirements described above, the membrane system will produce a permeate gas at a temperature of 50-90° C. containing 40-70% water. Cooling this gas to about 20° C. even at sub atmospheric pressures of 0.1 to 0.4 bar causes the bulk of the water vapor content in the gas to condense and be removed as liquid water. The volume of $CO_2$ and $N_2$ left in residual water sent to the vacuum pump is then much smaller, and so the size of the vacuum pump (211) needed is reduced. More importantly, condensing and removing the water vapor enriches the $CO_2$ in the permeate gas. The $CO_2$ content of the gas is twice concentrated, once in the membrane separation step (205) and again in the water vapor condensation step (208).

The Vacuum Step

The final step in the FIG. 2 process is the vacuum step (212) where the $CO_2$, $N_2$ and residual water vapor are compressed to atmospheric pressure or above to be discharged or sent to some other processes. If required, a final cooling step can be used after the vacuum pump to remove the remaining water.

EXAMPLES

In the example calculations used to illustrate our invention that follow, we will use the permeance properties shown in Table 3. However it is not implied that these permeance and selectivity values limit the scope of the invention. All the invention requires is a $CO_2/N_2$ selectivity of at least 10, recognizing that selectivities of up to 50 or more may be possible. It also requires an $H_2O/CO_2$ selectivity of greater than about 2, but recognizing that selectivities of up to 10 or more are also possible.

TABLE 3

| Gas | $CO_2$ | $H_2O$ | $N_2$ | $O_2$ |
|---|---|---|---|---|
| Membrane permeance (gpu) | 2,000 | 5,000 | 80 | 160 |
| $CO_2$/- selectivity | 1 | 0.4 | 25 | 12.5 |

Example One. The Process of FIG. 3, Varying the Feed Gas Temperature

Figure 3:
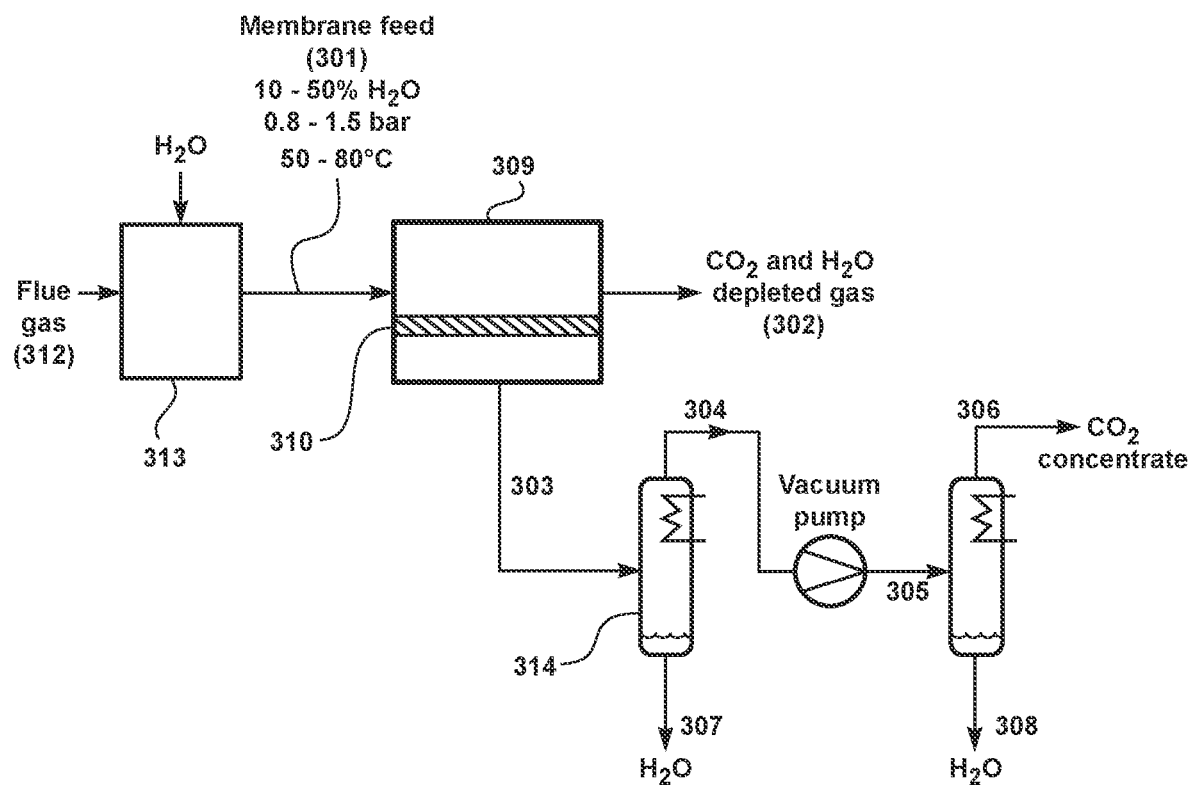
FIG. 3 is an illustration of a specific example of the process of our invention.

This example illustrates the benefits of our invention by operating the membrane separation system shown in FIG. 3 at different temperatures. In this example, the treated flue gas feed (301) entering the membrane unit (309) will range from 50-80° C. In all calculations reported, the gas is saturated with water vapor at the feed temperature and pressure of 1.0 bar. However, in industrial plants, the gas may not be completely saturated and relative humidities of 70-100% are possible. To simplify the calculation, the effect of temperature on the permeance and selectivity will be ignored and all calculations will use the permeance numbers shown in Table 3.

Table 4 shows the results at a membrane feed gas temperature of 80° C. and Table 5 shows the results at a feed temperature of 40° C. In both examples, the temperature of the condensation step is set at 20° C. Thus, the difference in temperature between the membrane feed (301) and condensation step (304) is 60° C. in Table 4 and 20° C. in Table 5. In both of the examples, the flue gas feed gas (312) on a dry basis has a composition of 10% $CO_2$, 90% $N_2$ and has a flowrate of 5,100 (std) m$^3$/h. The gas contains 1 ton/h of $CO_2$. Before delivery to the membrane module, the gas is brought to the required temperature and is saturated with water in the pretreatment unit (313). At 80° C., the gas (301) contains 47.4% water, at 40° C. the gas (301) contains 7.4% water. In both examples, the membrane unit (309) has the membrane area required to remove 80% of the $CO_2$ content of this gas into permeate stream (303). The characteristics of the key streams of the process are given in Tables 4 and 5.

TABLE 4

Membrane Process Treats 80° C. Water Saturated Feed

|  | Feed (301) | Residue (302) | Permeate before cond. (303) | Permeate before vac. pump (304) | Permeate after pump cond. (306) |
|---|---|---|---|---|---|
| | | | Component Conc. (mol %) | | |
| $CO_2$ | 5.3 | 2.3 | 7.9 | 35.6 | 39.1 |
| $N_2$ | 47.3 | 88.2 | 11.6 | 52.7 | 58.0 |
| $H_2O$ | 47.4 | 9.6 | 80.6 | 11.7 | 2.9 |
| Pressure (bar) | 1.0 | 1.0 | 0.2 | 0.2 | 1.0 |
| Temp (° C.) | 80 | 78 | 79 | 20 | 20 |

*Membrane Area = 3,925 m², Vacuum pump power (@ 80% efficiency), 84.2 kWh

TABLE 5

Membrane Process Treats 40° C. Water Saturated Feed

|  | Feed (301) | Residue (302) | Permeate before cond. (303) | Permeate before vac. pump (304) | Permeate after pump cond. (306) |
|---|---|---|---|---|---|
| | | | Component Conc. (mol %) | | |
| $CO_2$ | 9.3 | 2.8 | 22.1 | 24.0 | 26.3 |
| $N_2$ | 83.4 | 95.6 | 59.3 | 64.3 | 70.8 |
| $H_2O$ | 7.4 | 1.8 | 18.6 | 11.7 | 2.9 |
| Pressure (bar) | 1.0 | 1.0 | 0.2 | 0.2 | 1.0 |
| Temp (° C.) | 40 | 40 | 40 | 20 | 20 |

*Membrane Area = 6,450 m², Vacuum pump power (@ 80% efficiency), 127.8 kWh

Comparing these two tables, it is clear that even though the membrane properties and pressures across the membrane are the same, operating the process with water saturated gas at 80° C. produces a much better result than operating the process at 40° C. At 80° C., the membrane area required to remove 80% of the $CO_2$ is 40% less than at 40° C. This benefit is a result of the permeate side dilution effect of the co-permeating water. The water that permeates the membrane dilutes the $CO_2$ in the permeate gas. This dilution increases the $CO_2$ partial pressure driving force across the membrane, increasing the $CO_2$ flux. As a result, the membrane area required (310) to remove 80% of the $CO_2$ from the membrane feed gas (301) is reduced. The process also uses 34% less power, and after cooling and condensation, that removes most of the co-permeated water. This benefit is caused by the increase in the $CO_2$ concentration and the reduction in volume in the gas leaving the permeate condenser (304) going to vacuum pump (311). Finally, the gas leaving the process (306) has a significantly higher $CO_2$ concentration at 39% versus 26.3%.

Figure 4:
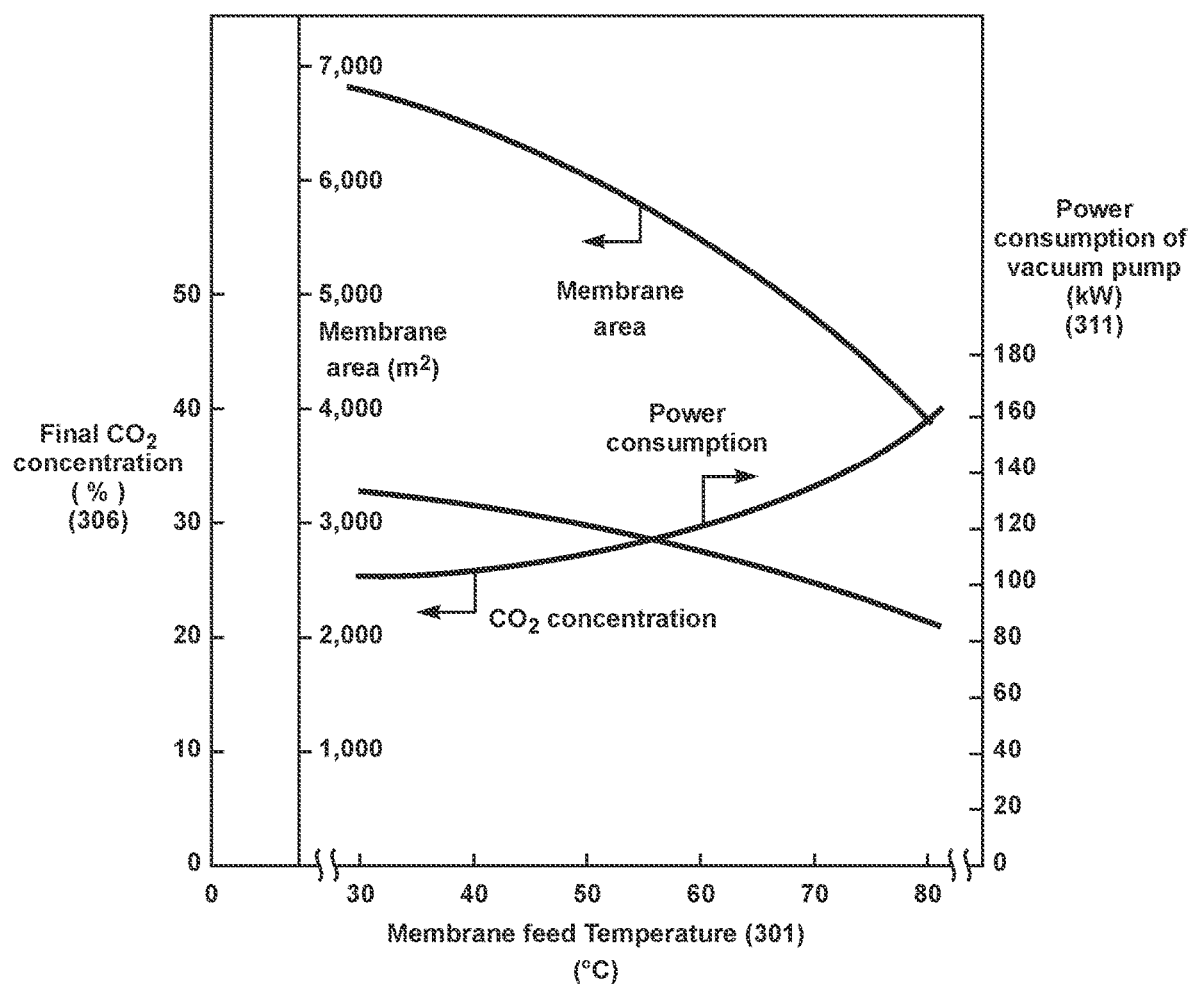
FIG. 4 is a plot showing the benefit of raising the water concentration in the membrane feed gas prior to separation.

FIG. 4 shows in graphical form results of additional calculations in which these key process benefits described above are shown over the membrane feed gas temperature range 30-80° C., all at 80% $CO_2$ capture into stream (306). At operating temperatures below about 50° C., the temperature difference between the feed (301) and the condensed gas (304) is only 30° C., so the benefit of adding water to the flue gas stream is small. This is because the water content of the gas is less than 10%, so that the concentration of water in permeate (303) is not very high and condensation to 20° C. to remove the water is less effective. At higher temperatures, such as 80° C., the difference in the temperature is 60° C., so the water content of the feed gas is significantly higher, in the range of about 20-50% water and so the permeate side dilution effect of water is much more significant. The difference in temperature should normally be at least 40° C. In this process, the feed gas to the membrane should contain at least 15% water and most preferably at least 25% water to achieve a benefit large enough to make the process worthwhile. This is the most preferred operating range.

The need to have a relatively high concentration of water on the feed side of the membrane to produce a useful improvement in process performance also explains why the process is limited to low pressures on the feed side and vacuum operation on the permeate side. At a feed pressure of 1 bar and 80° C., the maximum concentration of water in the feed gas is 47% water, at 2 bar and 80° C., the water content is only 24%, and at 3 bar only about 16%.

Figure 5:
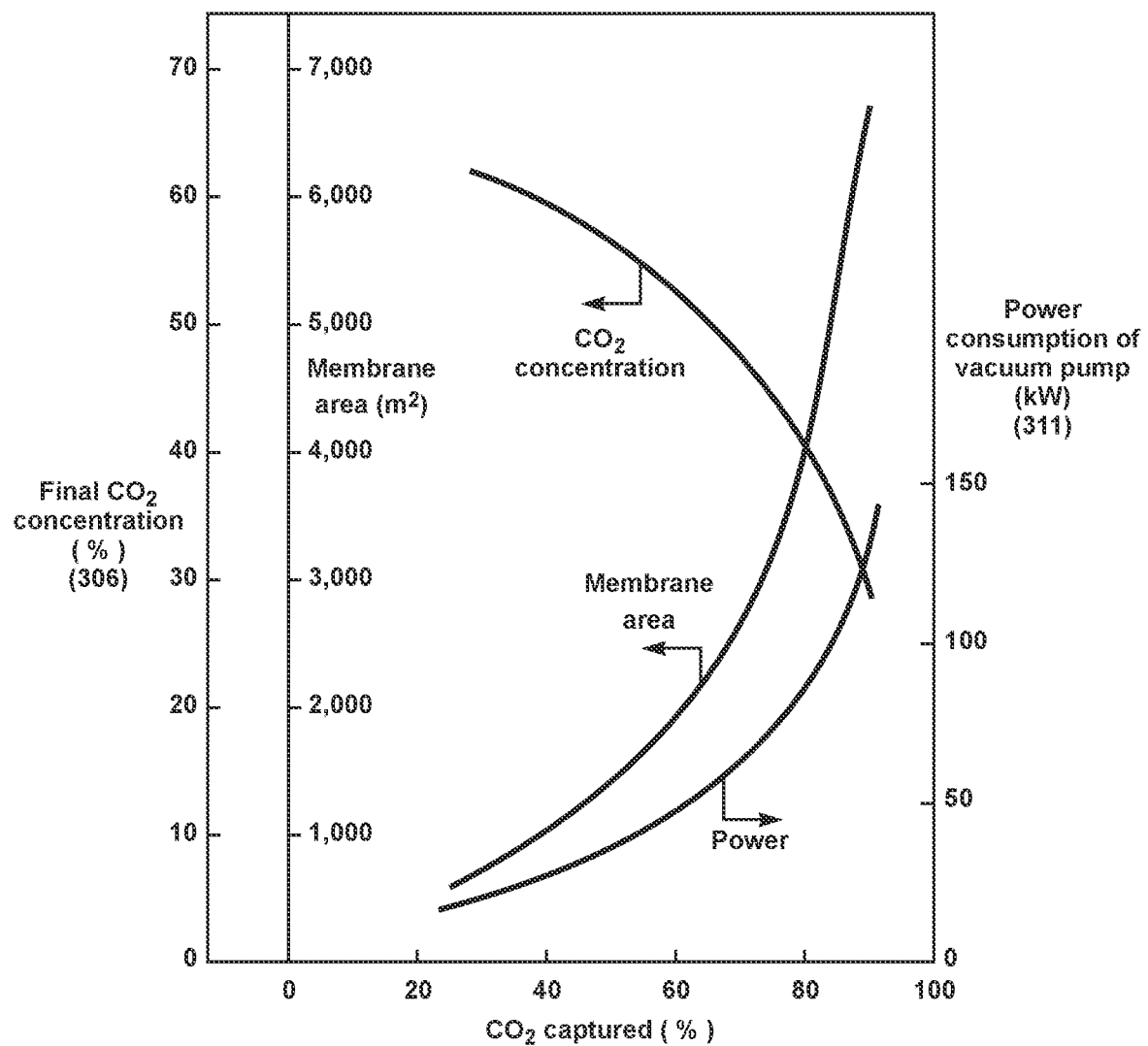
FIG. 5 is a plot showing the effect of $CO_2$ capture rate on system performance.

Example 2. The Process of FIG. 3 at 80° C. with Saturated Feed Gas and Varying the $CO_2$ Capture Rate of the Process The capture rate in the process illustrated in FIG. 3 can be varied by changing the membrane area. Table 6 shows this effect for a flue gas feed at 80° C. in which the $CO_2$ capture rate is varied from 30-90%. FIG. 5 shows these same results in graphical form. These results show that both the power consumption and membrane area used per ton of $CO_2$ decrease as the capture rate is reduced. The $CO_2$ concentration in the final permeate (306) on a dry basis is also increased as the capture rate is reduced. This makes downstream treatment of the permeate to bring the $CO_2$ concentration to greater than 95% easier. However, users of the technology need to reduce their $CO_2$ impact on the environment, and so plant builders are motivated to obtain high $CO_2$ capture rates. Also, the cost of installing the process is about the same irrespective of the capture rate, so this also favors high capture rates. It follows that a tradeoff exists between capture rate and process cost. The best range for the process is in the range of 50-80% capture. Because of the rapid increase in area and power needed, capture rates above 80%, although possible by our process, are not preferred

TABLE 6

The Process of Figure 3 with feed gas saturated with water vapor at 80° C. The membrane area is varied to change the $CO_2$ capture rate from 30-90% $CO_2$. The membrane permeances are shown in Table 3.

| $CO_2$ Capture Rate (%) | Conc. of separated $CO_2$ (306) | Power Consumption of Vacuum Pump (kW) (311) | Area of Membrane (m²) (310) |
|---|---|---|---|
| 90 | 29.8 | 126.7 | 6,490 |
| 80 | 39.4 | 84.5 | 3,920 |
| 70 | 46.9 | 61.6 | 2,640 |
| 60 | 52.6 | 46.9 | 1,890 |
| 50 | 56.6 | 36.0 | 1,400 |

TABLE 6-continued

The Process of Figure 3 with feed gas saturated with water vapor at 80° C. The membrane area is varied to change the $CO_2$ capture rate from 30-90% $CO_2$. The membrane permeances are shown in Table 3.

| $CO_2$ Capture Rate (%) | Conc. of separated $CO_2$ (306) | Power Consumption of Vacuum Pump (kW) (311) | Area of Membrane (m²) (310) |
|---|---|---|---|
| 40 | 59.6 | 27.2 | 1,030 |
| 30 | 61.8 | 19.6 | 730 |

Example 3 the Process of the Invention Applied to Coal Power Plant Flue Gas

The flue gas from a modern coal power plant typically contains about 12% $CO_2$, 18% $H_2O$ and 70% $N_2$, $O_2$, and Ar. The gas will usually have been treated by a flue gas desulfurization unit which it leaves at a few degrees above its dewpoint, generally at 56-58° C. Table 7 shows a trial calculation using the process of FIG. 3 to treat this gas. The gas (301) is at 58° C., so the operating temperature is at the lower end of what is desirable for our process. However the feed gas if used as is, without pretreatment, still contains 18% $H_2O$, so the permeate contains more than 40% water. When the permeate (303) is cooled to 20° C., more than 80% of the water content is condensed, significantly reducing the size of the vacuum pump needed and enriching the $CO_2$ content of the gas after cooling (304) to 42.1% $CO_2$. The concentration of the $CO_2$ rises to 46.6% if a final optional (20° C.) condenser (308) is used to produce gas (306).

TABLE 7

Feed Gas (301) at 58° C.

| | Feed (301) | Residue (302) | Permeate before cond. (303) | Permeate before vac. pump (304) | Permeate after pump cond. (306) |
|---|---|---|---|---|---|
| | | | Component Conc. (mol %) | | |
| $CO_2$ | 12.0 | 5.3 | 27.0 | 42.1 | 46.5 |
| $N_2$ | 67.0 | 85.8 | 27.5 | 42.9 | 47.4 |
| $H_2O$ | 18.0 | 5.5 | 43.3 | 11.7 | 2.3 |
| $O_2$ | 3.0 | 3.4 | 2.2 | 3.3 | 3.7 |
| Pressure (bar) | 1.0 | 1.0 | 0.2 | 0.2 | 1.0 |
| Temp (° C.) | 58 | 57 | 57 | 20 | 20 |

*Membrane area = 2,310 M²; Vacuum pump power (@ 80% effic.) = 62.8 kWh; 70% $CO_2$ capture Depending on the power plant, low-grade heat in the range of 70-100° C. may be available. If this heat is available, it can be used to increase the temperature and water saturation concentration of the gas being treated by the membrane. An increase of even a few degrees from 58 to 65° C., for example by raising the water concentration in the feed gas to 25% $H_2O$, produces useful improvements in the process as the data in Table 8 show.

TABLE 8

Feed gas (301) at 65° C.

| | Feed (301) | Residue (302) | Permeate before cond. (303) | Permeate before vac. pump (304) | Permeate after pump cond. (306) |
|---|---|---|---|---|---|
| | | | Component Conc. (mol %) | | |
| $CO_2$ | 11.0 | 5.1 | 21.9 | 42.3 | 50.0 |
| $N_2$ | 61.2 | 83.9 | 19.2 | 39.9 | 44.1 |
| $H_2O$ | 24.0 | 7.6 | 57.3 | 11.7 | 2.3 |
| $O_2$ | 27 | 3.4 | 1.5 | 3.2 | 3.5 |
| Pressure (bar) | 1.0 | 1.0 | 0.2 | 0.2 | 1.0 |
| Temp (° C.) | 65 | 64 | 65 | 20 | 20 |

*Membrane area = 2.050 m2; Vacuum pump (@ 80% effc.) = 58.3 kWh, 70% $CO_2$ capture.

The residue stream from the process (302) can be discharged to a chimney. The final permeate (306) contains 50% $CO_2$ and may find use as in various algae or $CO_2$ processing applications, in cement plants for example. More commonly, the gas can be sent for further concentration by absorption, membrane, or cryogenic processes to produce more than 98% $CO_2$ for sequestration or use in enhanced oil recovery processes.

Example 4. The Process of the Invention Applied to a Natural Gas Boiler Exhaust or a Natural Gas Power Plant Fitted With Partial Exhaust Gas Recycle The exhaust from a natural gas plant boiler used to produce high temperature steam will typically be very hot, often about 150° C., and will have a typical composition of about 8% $CO_2$, 16% $H_2O$, 4% $O_2$ and 72% $N_2$. The dew point of the gas is about 56° C., but if the gas is cooled by contacting with $H_2O$ in a direct contact cooler, the saturation point of the gas when cooled from 150° C. is 62° C. At this temperature, the gas contains 20.9% $H_2O$. The performance of our membrane process using the FIG. 3 design is given in Table 9.

TABLE 9

Feed gas (301) at 62° C.

| | Feed (301) | Residue (302) | Permeate before cond. (303) | Permeate before vac. pump (304) | Permeate after pump cond. (306) |
|---|---|---|---|---|---|
| | | | Component Conc. (mol %) | | |
| $CO_2$ | 7.5 | 3.3 | 16.9 | 31.2 | 34.5 |
| $N_2$ | 67.8 | 85.8 | 28.1 | 52.0 | 57.6 |
| $H_2O$ | 20.9 | 6.6 | 52.3 | 11.7 | 2.3 |

TABLE 9-continued

Feed gas (301) at 62° C.

|  | Feed (301) | Residue (302) | Permeate before cond. (303) | Permeate before vac. pump (304) | Permeate after pump cond. (306) |
|---|---|---|---|---|---|
| $O_2$ | 3.8 | 4.2 | 2.7 | 5.0 | 5.6 |
| Pressure (bar) | 1.0 | 1.0 | 0.2 | 0.2 | 1.0 |
| Temp (° C.) | 62 | 61 | 61 | 20 | 20 |

*Membrane area = 3,770 m2; Vacuum pump (@ 80% effc.) = 85.0 kWh, 70% $CO_2$ capture Example 5. The Process of FIG. 3 Using Sequential Condensation Systems In the example calculations reported in Tables 7 to 9 to illustrate the process of the invention, a one-stage condenser represented as unit (314) is shown in FIG. 3. Such a simple system could be used, but in large systems, multiple condensers in series might be used to reduce the amount of refrigerated cooling water needed. For example, a first condenser using 25° C. cooling water could be used to bring the permeate gas to 30° C., a second condenser using 20° C. cooling water could be used to bring the gas to 25° C. while a final condenser using chilled water at 15° C. could then be used to bring the gas to 20° C., while refrigerated water could be used to bring the gas to even lower temperatures of 5-10° C. if desired. Using these systems reduces the volume of gas going through the vacuum pump, and so reduces the power consumption of unit (311). However, this benefit has to be offset against the cost of providing chilled water. By using sequential cooling steps, the cost of providing the chilled cooling water required is reduced.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What I claim is:

1. A membrane process to separate $CO_2$ from flue gas, the process comprising:
    passing a fluid stream including the flue gas across a membrane permeable to $CO_2$ and $H_2O$;
    removing treated gas from a feed side of the membrane, the treated gas having less $CO_2$ than the flue gas;
    removing permeate from a permeate side of the membrane at a sub atmospheric pressure between 0.1 to 0.4 bar, the permeate comprising $CO_2$ and $H_2O$;
    cooling the permeate to remove at least some of the $H_2O$ from the permeate and form a smaller volume of $H_2O$-depleted, $CO_2$ enriched permeate; and
    using a vacuum pump to increase the gas pressure of the smaller volume of $H_2O$-depleted, $CO_2$ enriched permeate to at least about atmospheric pressure.

2. The membrane process as set forth in claim 1, wherein the fluid stream passed across the membrane contains at least 70% of its saturation concentration of water.

3. The membrane process as set forth in either of claim 1 or claim 2, wherein the temperature difference between the fluid stream passed across the membrane and the smaller volume of $H_2O$-depleted $CO_2$-enriched permeate is at least 40° C.

4. The membrane process as set forth in claim 1, further comprising adding $H_2O$ to the flue gas before passing the fluid stream across the membrane such that the fluid stream that is passed across the membrane includes the flue gas and the water.

5. The membrane process as set forth in claim 4, wherein said adding $H_2O$ to the flue gas comprises using a direct contact cooler to add $H_2O$ to the flue gas before passing the fluid stream including the flue gas through the membrane.

6. The membrane process as set forth in claim 5, wherein the direct contact cooler adjusts a temperature of the flue gas.

7. The membrane process as set forth in claim 1, further comprising bringing the fluid stream including the flue gas to a pressure of 0.8 to 1.5 bar before passing the fluid stream across the membrane.

8. The membrane process as set forth in claim 1, further comprising bringing the fluid stream including the flue gas to a temperature of greater than 50° C. before passing the fluid stream across the membrane.

9. The membrane process as set forth in claim 1, further comprising bringing the fluid stream including the flue gas to a temperature in range of from about 50° C. to about 80° C. before passing the fluid stream across the membrane.

10. The membrane process as set forth in claim 1, further comprising bringing the fluid stream including the flue gas to have greater than 10 mol % water vapor.

11. The membrane processes as set forth in claim 1, comprising bringing the fluid stream including the flue gas to have greater than 70% of its saturation water concentration.

12. The membrane process as set forth in claim 1, wherein the membrane has an $H_2O/CO_2$ selectivity of greater than 2, measured at the operating conditions of the membrane process.

13. The membrane process as set forth in claim 1, wherein the membrane has a $CO_2/N_2$ selectivity of greater than 10, measured at the operating conditions of the membrane process.

14. The membrane process as set forth in claim 1, wherein the membrane process removes at least 50% of the $CO_2$ of the flue gas.

15. The membrane process as set forth in claim 1, wherein the membrane process removes about 50% to about 80% of the $CO_2$ of the flue gas.

16. The membrane process as set forth in claim 1, wherein said cooling the permeate comprises cooling the permeate to a temperature in an inclusive range of from about 5° C. to about 30° C.

17. The membrane process as set forth in claim 1, wherein the smaller volume of $H_2O$-depleted, $CO_2$ enriched permeate has a $CO_2$ concentration of greater than 35%.

18. The membrane process as set forth in claim 1, wherein the fluid stream passed across the membrane contains at least 70% of its saturation concentration of water and wherein the temperature difference between the fluid stream passed across the membrane and the smaller volume of $H_2O$-depleted, $CO_2$-enriched permeate is at least 30° C.

19. The membrane process as set forth in claim 18, wherein the fluid stream passed across the membrane contains at least 80% of its saturation concentration of water.

20. The membrane process as set forth in claim 19, wherein the temperature difference between the fluid stream passed across the membrane and the smaller volume of $H_2O$-depleted $CO_2$-enriched permeate is at least 40° C.

21. The membrane process as set forth in claim 18, further comprising adding $H_2O$ to the flue gas before passing the fluid stream across the membrane such that the fluid stream that is passed across the membrane includes the flue gas and the water.

22. The membrane process as set forth in claim 21, wherein said adding $H_2O$ to the flue gas comprises using a direct contact cooler to add $H_2O$ to the flue gas before passing the fluid stream including the flue gas across the membrane.

23. The membrane process as set forth in claim 22, wherein the direct contact cooler adjusts a temperature of the flue gas.

24. The membrane process as set forth in claim 18, further comprising bringing the fluid stream including the flue gas to a pressure of 0.8 to 1.5 bar before passing the fluid stream across the membrane.

25. The membrane process as set forth in claim 18, further comprising bringing the fluid stream including the flue gas to a temperature of greater than 50° C. before passing the fluid stream across the membrane.

26. The membrane process as set forth in claim 18, further comprising bringing the fluid stream including the flue gas to a temperature in a range of from about 50° C. to about 80° C. before passing the fluid stream across the membrane.

27. The membrane process as set forth in claim 18, further comprising bringing the fluid stream including the flue gas to have greater than 10 mol % water vapor.

28. The membrane process as set forth in claim 18, wherein the membrane has an $H_2O/CO_2$ selectivity of greater than 2, measured at the operating conditions of the membrane process.

29. The membrane process as set forth in claim 18, wherein the membrane has a $CO_2/N_2$ selectivity of greater than 10, measured at the operating conditions of the membrane process.

30. The membrane process as set forth in claim 18, wherein the membrane process removes at least 50% of the $CO_2$ of the flue gas.

31. The membrane process as set forth in claim 18, wherein the membrane process removes about 50% to about 80% of the $CO_2$ of the flue gas.

32. The membrane process as set forth in claim 18, wherein said cooling the permeate comprises cooling the permeate to a temperature in an inclusive range of from about 5° C. to about 30° C.

33. The membrane process as set forth in claim 18, wherein the smaller volume of $H_2O$-depleted, $CO_2$ enriched permeate has a $CO_2$ concentration of greater than 35%.

34. The membrane process as set forth in claim 18, wherein the fluid stream passed across the membrane has a temperature of at least 50° C. and no more than 90° C., has greater than 10 mol % water vapor, and has a gas pressure less than or equal to 2 bar.

35. The membrane process as set forth in claim 34, wherein the fluid stream passed across the membrane has a temperature of no more than 80° C.

36. The membrane process as set forth in claim 35, wherein the fluid stream passed across the membrane has a temperature of no more than 70° C.

37. The membrane process as set forth in claim 34, wherein the fluid stream passed across the membrane has greater than 15 mol % water vapor.

38. The membrane process as set forth in claim 34, wherein the fluid stream passed across the membrane has greater than 25 mol % water vapor.

39. The membrane process as set forth in claim 35, wherein the gas pressure of the fluid stream passed across the membrane is less than 1.5 bar.

40. The membrane process as set forth in claim 34, wherein the temperature difference between the fluid stream passed across the membrane and the smaller volume of $H_2O$-depleted $CO_2$-enriched permeate is at least 40° C.

41. The membrane process as set forth in claim 40, wherein the fluid stream passed across the membrane has a temperature of no more than 80° C., wherein the fluid stream passed across the membrane has greater than 15 mol % water vapor, and wherein the gas pressure of the fluid stream passed across the membrane is less than 1.5 bar.

42. The membrane process of claim 41, further comprising pretreating the flue gas to obtain the fluid stream passed across the membrane.

43. The membrane process of claim 34, further comprising pretreating the flue gas to obtain the fluid stream passed across the membrane.

44. The membrane process of claim 18, further comprising pretreating the flue gas to obtain the fluid stream passed across the membrane.

45. A membrane process to separate $CO_2$ from flue gas comprising:
(i) bringing the flue gas to a pressure of 0.8 to 1.5 bar and a temperature of greater than 50° C., wherein the flue gas contains greater than 10 mol % water vapor;
(ii) passing the flue gas from (i) across a membrane permeable to water and $CO_2$, said membrane having an $H_2O/CO_2$ selectivity of greater than 2 and a $CO_2/N_2$ selectivity of greater than 10, measured at the operating conditions of the membrane process;
(iii) removing from the feed side of the membrane of (ii) a treated flue gas stream from which at least 50% of the $CO_2$ content of the flue gas has been removed;
(iv) removing from the permeate side of the membrane in (ii) at a pressure of 0.1 to 0.4 bar, a permeate gas enriched in $CO_2$ and $H_2O$;
(v) cooling the permeate gas from (iv) to a temperature of 5-30° C. to condense a portion of the $H_2O$ content of the permeate gas and so lowering the $H_2O$ concentration of the permeate gas to produce a water-depleted permeate gas;
(vi) separating the condensed water from the water-depleted permeate gas; and
(vii) using a vacuum pump to bring the water-depleted permeate gas from (v) to atmospheric pressure or above.

46. The process of claim 45, wherein the membrane process removes 50-80% of the $CO_2$ content of the flue gas.

47. The process of claim 45, wherein the flue gas to the membrane has a temperature between 50-80° C.

48. The process of claim 45, wherein the water vapor content of the flue gas is 70-100% of the water saturation concentration of the flue gas.

49. The process of claim 45, wherein a direct contact cooler is used to adjust the temperature and water concentration of the flue gas in step (i).

50. The process of claim 45, wherein the flue gas is generated by a coal power plant, a natural gas power plant, a natural gas boiler, a cement plant, a steel plant or an oil refinery.

51. The process of claim 45, wherein the difference in the water concentration of the flue gas in (i) and the permeate gas enriched in $CO_2$ and $H_2O$ in (iv) differ by at least a factor of 2.

52. The process of claim 45, wherein the difference in temperature between the flue gas passing across the membrane in (ii) and the cooled permeate gas in (v) is more than 30° C.

* * * * *